(12) United States Patent
Chipper

(10) Patent No.: US 6,999,243 B2
(45) Date of Patent: Feb. 14, 2006

(54) FIXED FOCUS, OPTICALLY ATHERMALIZED, DIFFRACTIVE INFRARED ZOOM OBJECTIVE LENS

(75) Inventor: Robert B. Chipper, Allen, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/402,501

(22) Filed: Mar. 28, 2003

(65) Prior Publication Data

US 2004/0036982 A1 Feb. 26, 2004

Related U.S. Application Data

(60) Provisional application No. 60/369,515, filed on Apr. 1, 2002.

(51) Int. Cl.
*G02B 15/14* (2006.01)
*G02B 13/14* (2006.01)

(52) U.S. Cl. ............ 359/690; 359/354; 359/356; 359/357

(58) Field of Classification Search .......... 359/353, 359/354, 356, 357, 422, 690, 570
See application file for complete search history.

(56) References Cited

U.S. PATENT DOCUMENTS

| | | | |
|---|---|---|---|
| 4,802,717 A | 2/1989 | Kebo | |
| 5,504,628 A | 4/1996 | Borchard | 359/796 |
| 5,796,514 A | 8/1998 | Chipper | |
| 5,852,516 A | 12/1998 | Chipper | 359/676 |
| 5,973,827 A | 10/1999 | Chipper | 359/356 |
| 6,118,583 A * | 9/2000 | Rogers | 359/432 |
| 6,424,460 B1 * | 7/2002 | Kirkham | 359/353 |

FOREIGN PATENT DOCUMENTS

| | | |
|---|---|---|
| EP | 0 365 208 A2 | 4/1990 |
| EP | 0 441 206 A1 | 8/1991 |
| WO | WO 9959015 A1 * | 11/1999 |

* cited by examiner

*Primary Examiner*—Scott J. Sugarman
(74) *Attorney, Agent, or Firm*—William C. Schubert; Karl A. Vick

(57) ABSTRACT

A zoom lens assembly (10) compensates optically, as opposed to mechanically, for changes in temperature. In a preferred embodiment a difference in focus between WFOV and NFOV zoom lens positions, over temperature, is minimized such that any actual shift in focus falls within the depth of focus of the zoom lens assembly. The zoom lens assembly has, along an optical axis, first and third lens elements (12,16) that are made from a first material and that have a positive power, a second lens element (14) interposed between the first and third lens elements and movable along the optical axis between a WFOV and NFOV position. The second lens element has a negative power and is made of a second material. The materials are selected such that a change in refractive index for a change in temperature of the first material is less than a change in refractive index for a change in temperature of the second material. The zoom lens assembly also color corrects incident radiation using a diffractive surface on at least one of the first and third lens elements.

32 Claims, 9 Drawing Sheets

TABLE 1

| | CURRENT DESIGN PARAMETERS AND SELECTION CRITERIA | | | | | | |
|---|---|---|---|---|---|---|---|
| PART | MATERIAL | INDEX (@10 μm) | V NUMBER (8–12 μm) | Dn/DT (8–12 μm) [x10 −6/°C] | DIFFRACTIVE SURFACE | SURFACE TYPE | LENS POWER |
| LENS #1 | 1173 | 2.60 | 108 | 58 | YES SURFACE R2 | R1=SPHERE R2=ASPHERE | 0.23 |
| LENS #2 | Ge | 4.0 | 991 | 395 | NO | R1=SPHERE R2=ASPHERE | −0.81 |
| LENS #3 | 1173 | 2.60 | 108 | 58 | YES SURFACE R2 | R1=ASPHERE R2=SPHERE | 1.19 |

FIG.3

TABLE 2

| OPTICAL CHARACTERISTICS ||
|---|---|
| ZOOM RATIO | 2:1 |
| FIELD OF VIEW [DEGREES] | 11.6 NFOV TO 23 WFOV |
| ASPECT RATIO | 4:3 |
| F/NUMBER | F/1.0 NFOV TO F/0.9 WFOV |
| TOTAL NUMBER OF ELEMENTS | 3 |
| DIFFRACTIVE SURFACES | 2 |
| ASPHERIC LENSES | 3 |
| LENS MATERIAL | CHALCOGENIDE; TI 1173 AND GERMANIUM |
| OVERALL LENGTH | 3.50" |
| FOCUS MECHANISM | FIXED |
| EFL RANGE | 50mm NFOV TO 25mm WFOV |
| WAVEBAND | 8-12 MICRONS |

FIG.4

| GENERAL PROPERTIES OF AMTIR-3 ||
|---|---|
| COMPOSITION | $Ge_{28}Sb_{12}Se_{60}$ GLASS |
| DENSITY | $4.67 gms/cm^3$ |
| THERMAL EXPANSION | $13.5 \times 10^{-6}/°C$ |
| HARDNESS (KNOOP) | 150 |
| RUPTURE MODULUS | 2500psi |
| YOUNG'S MODULUS | $3.11 \times 10^6 psi$ |
| SHEAR MODULUS | $1.22 \times 10^6 psi$ |
| POISSON'S RATIO | 0.26 |
| THERMAL CONDUCTIVITY | $5.3 cal/cm\ sec°K \times 10^{-4}$ |
| SPECIFIC HEAT | $0.066 cal/gm°K$ |
| UPPER USE TEMPERATURE | $200°C$ |
| RESISTIVITY | $5 \times 10^{11} \Omega\ cm@500Hz$ |
| GLASS TRANSITION TEMPERATURE | $278°C$ |
| ANNEALING TEMPERATURE | $285°C$ |

FIG.7A

| AMTIR-3 THERMAL CHANGE IN REFRACTIVE INDEX 25-65°C $\Delta N/\Delta T°C \times 10^6$ || DISPERSION  3-5μm 174  8-12μm 110 ||
|---|---|---|
| WAVELENGTH μm | LOW 25-(-197°C) | HIGH (25-150°C) |
| 3 | +58±2 | +98±4 |
| 5 | +57±2 | +92±4 |
| 8 | +55±2 | +87±8 |
| 10 | +56±2 | +91±11 |
| 12 | +56±2 | +93±6 |

FIG.7B

| DN/DT FOR COMMONLY USED IR MATERIALS |||
|---|---|---|
| MATERIAL | 3-5 μm [×10⁻⁶/°C] | 8-12 μm [×10⁻⁶/°C] |
| GERMANIUM (Ge) | 500 | 395 |
| TI-1173 | 58 | 58 |
| AMTIR-3 | 94 | 91 |
| GASIR2 | 58 | 58 |
| ZINC SELENIDE (ZnSe) | 62 | 61 |
| ZINC SULFIDE (ZnS) | 43 | 41 |
| SILICONE (Si) | 171 | 160 |
| GALLIUM ARSENIDE (GaAs) | 160 | 147 |

FIG.8

FIXED FOCUS, OPTICALLY ATHERMALIZED, DIFFRACTIVE INFRARED ZOOM OBJECTIVE LENS

CLAIM OF PRIORITY FROM A COPENDING U.S. PROVISIONAL PATENT APPLICATION

This patent application claims priority under 35 U.S.C. 119(e) from Provisional Patent Application No.: 60/369,515, filed Apr. 1, 2002, the content of which is incorporated by reference herein in its entirety.

TECHNICAL FIELD

This invention relates generally to multi-lens optical systems and, more specifically, relates to those multi-lens systems optical where at least one lens is moveable relative to another lens, such as in a zoom lens optical system for use in imaging infrared (IR) radiation.

BACKGROUND

IR or thermal imaging systems typically use a plurality of thermal sensors to detect IR radiation and may produce an image capable of being visualized by the human eye. For example, thermal imaging systems typically detect thermal radiance differences between various objects in a scene and display these differences in thermal radiance as a visual image of the scene. Thermal imaging systems are often used to detect fires, overheating machinery, aircraft, vehicles and people, and to control temperature sensitive industrial processes.

The basic components of a thermal imaging system generally include optics for collecting and focusing IR radiation from the scene, an IR detector having a plurality of thermal sensors for converting the IR radiation to an electrical signal, and electronics for amplifying and processing the electrical signal into a visual display and/or for storage in an appropriate medium. A chopper is often included in a thermal imaging system to modulate the IR radiation and to produce a constant background radiance which provides a reference signal. The electronic processing portion of the thermal imagining system will subtract the reference signal from the total radiance signal to produce a signal with minimum background bias.

Thermal imaging systems may use a variety of IR detectors. An IR detector is a device that responds to electromagnetic radiation in the IR spectrum. IR detectors are sometimes classified into two main categories as cooled and uncooled. A cooled IR detector is an IR detector that must be operated at cryogenic temperatures, such at the temperature of liquid nitrogen, to obtain the desired sensitivity to variations in IR radiation. Cooled detectors typically employ thermal sensors having small bandgap semiconductors that generate a change in voltage due to photoelectron interaction. This latter effect is sometimes called the internal photoelectric effect.

Uncooled IR detectors cannot make use of small bandgap semiconductors because the dark current component swamps any signal at room temperature. Consequently, uncooled detectors rely on other physical phenomenon and are typically less sensitive than cooled detectors. However, because uncooled detectors do not require the presence of a cryogenic cooler and associated components, they are less bulky and consume less energy than cooled detectors, they are the preferred choice for portable, low power applications where the greater sensitivity of cooled detectors is not required. In a typical uncooled thermal detector, IR photons are absorbed by the thermal detector and the resulting temperature difference of the absorbing element is detected. Typical uncooled thermal detectors include a pyroelectric detectors, thermocouples and bolometers.

An IR window is a frequency region in the IR spectrum where there is good transmission of electromagnetic radiation through the atmosphere. Typically, IR detectors sense IR radiation in the spectral bands from 3 to 5 microns (having an energy of 0.4 to 0.25 eV) and from 8 to 14 microns (having an energy of 0.16 to 0.09 eV). The 3 to 5 micron spectral band is generally termed the "near IR band" while the 8 to 14 micron spectral band is termed the "far IR band." IR radiation between the near and far IR bands cannot normally be detected due to atmospheric absorption, although this problem does not arise in those IR imaging systems used in the vacuum of space, which enables the 5–8 micron mid-range IR spectral band to be detected.

The IR scene radiation is typically focused onto a thermal detector by one or more IR lens. IR lenses may be classified as a single field of view lens or as a zoom lens. Zoom lenses, in turn, may be designed to function as a continuous zoom lens or as a two-position zoom lens.

Representative U.S. Patents include U.S. Pat. No. 5,852,516, "Dual Purpose Infrared Lens Assembly Using Diffractive Optics", Robert B. Chipper, and U.S. Pat. No. 5,973,827, "Refractive/Diffractive Infrared Imager and Optics", also by Robert B. Chipper.

However, a problem exists in that conventional IR zoom lenses used with uncooled detectors can drift out of focus as the temperature increases or decreases, typically over a range of about −10° C., or less, to about 50° C., or more. The lens drift problem is due in large part to the typically large rate of change of the index of refraction of the lens material as a function of the temperature of the lens material.

Referring to FIG. 1, there is shown a conventional zoom lens assembly 1 having three lenses 2, 3 and 4. The three lenses are each constructed of the same IR radiation transmissive material, or Germanium (Ge) in this case. None of the lens surfaces are diffractive in nature. Lens 3 is movable between a wide field of view (WFOV) and a narrow field of view (NFOV) position by a lens drive assembly 5.

A conventional solution to the temperature-induced focus drift problem involves providing a complex and expensive electro-mechanical assembly 5 to maintain focus over temperature by re-focusing at least the lens 3 within the zoom lens assembly 1. The lens drive assembly may use one or more motors coupled with one or more cams having non-linear motion, and these are combined with motor-driving software that may require look-up tables in order to change the physical location of the lens element 3 over temperature, and as a function of the desired field of view of the lens. This is required as the focusing will typically exhibit a different focus rate versus temperature, depending on the selected zoom position (WFOV or NFOV). In addition, some type of temperature sensor, such as a thermocouple 6, is required to monitor the actual temperature of the zoom lens assembly 1 in order to provide an input to the motor driver software.

As can be appreciated, this complex and costly prior art approach to attempting to maintain focus with the zoom lens assembly is less than desirable.

Reference can also be made to U.S. Pat. No. 5,504,628, "Passive Athermalization of Optics", by J. F. Borchard. This patent discloses the use of a doublet lens that is optically passively athermalized by choosing two lens materials that have approximately the same Abbe number and substantially different thermal coefficients of refractive index. The ratio of the powers of the lens elements is designed to provide the desired passive athermalization. A diffractive surface is used on one of the lens elements to correct for chromatic aberration. Because the Abbe numbers are approximately the same for the two lens materials, the chromatic correction is said to not significantly change with temperature. This allows the ratio of the powers of the lens elements to control the focal length of the doublet with temperature being independent of chromatic correction.

While it could be argued that one might attempt to use this approach to construct a zoom lens assembly, its use would appear to require six lenses and three diffractive surfaces, i.e., the use of a diffractive doublet in place of each of the prior art lens elements 2, 3 and 4. As can be appreciated, the resulting optical system would require more a complex mechanical mounting arrangement and would have a significantly higher cost.

SUMMARY OF THE PREFERRED EMBODIMENTS

The foregoing and other problems are overcome, and other advantages are realized, in accordance with the presently preferred embodiments of these teachings.

In accordance with this invention the temperature-related problems are overcome by a selection and combination of IR lens materials, lens powers and diffractive surfaces. Through the use of this invention the focus variation over temperature is minimized and can be substantially eliminated between zoom positions. This enables the additional electro-mechanical mechanisms and temperature sensing thermocouple(s) to be eliminated, while still achieving an acceptable Modulation Transfer Function (MTF) performance (focus) over temperature.

The zoom lens assembly in accordance with this invention compensates optically, as opposed to mechanically, for changes in temperature, meaning that the difference in focus between two zoom lens positions (focus delta) over temperature is minimized to the point that the shift in focus falls within the depth of focus of the zoom lens assembly. By this technique an acceptable MTF performance over temperature is achieved, without requiring an electro-mechanical re-focusing of the lens elements to compensate for the change in zoom lens temperature.

In accordance with the teachings of this invention there is disclosed a specific order and selection criteria for the materials used in constructing the lenses, for the diffractive surface locations and for the relative powers between the lens elements, in order to achieve an acceptable nominal performance, as well as to achieve the maintenance of focus over a range of temperatures. In particular, and for an embodiment of a three lens zoom lens assembly, the first and third lens are of positive power and the second lens is of negative power. Further, diffractive surfaces are used with the lenses of low dispersion (low V number), the first and third lenses in the three lens embodiment.

In a preferred embodiment a difference in focus between WFOV and NFOV zoom lens positions, over temperature, is minimized such that any actual shift in focus falls within the depth of focus of the zoom lens assembly. The zoom lens assembly has, along an optical axis, first and third lens elements that are made from a first material and that have a positive power, a second lens element interposed between the first and third lens elements and movable along the optical axis between a WFOV and NFOV position. The second lens element has a negative power and is made of a second material. The materials are selected such that a change in refractive index for a change in temperature of the first material is less than a change in refractive index for a change in temperature of the second material. The zoom lens assembly also color corrects incident radiation using a diffractive surface on at least one of the first and third lens elements.

In a preferred embodiment a value of dn/dT (change in refractive index for a change in temperature) for the first and third lens elements is less than about 175, and the dn/dT for the second lens element is greater than about 375. In the preferred embodiment of this invention the dn/dT for the second lens element is at least about two times greater than the dn/dT for the first and third lens elements. In a more preferred embodiment of this invention the dn/dT for the second lens element is at least about three times greater than the dn/dT for the first and third lens elements. In an exemplary implementation of the most preferred embodiment the dn/dT for the second lens element is about 395, and the dn/dT for each of the first and third lens elements is about 58.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3 illustrates a Table that shows design parameters and selection criteria for the zoom lens assembly of FIG. 2;

FIG. 4 illustrates a Table that shows the optical characteristics of the zoom lens assembly of FIG. 2;

FIG. 7A lists general properties of AMTIR-3, FIG. 7B lists values for the thermal change in refractive index over the range of 25–65° C., FIG. 8 illustrates a Table that lists the DN/DT for a number of commonly used IR materials.

DETAILED DESCRIPTION OF THE PREFERRED EMBODIMENTS

Figure 2:
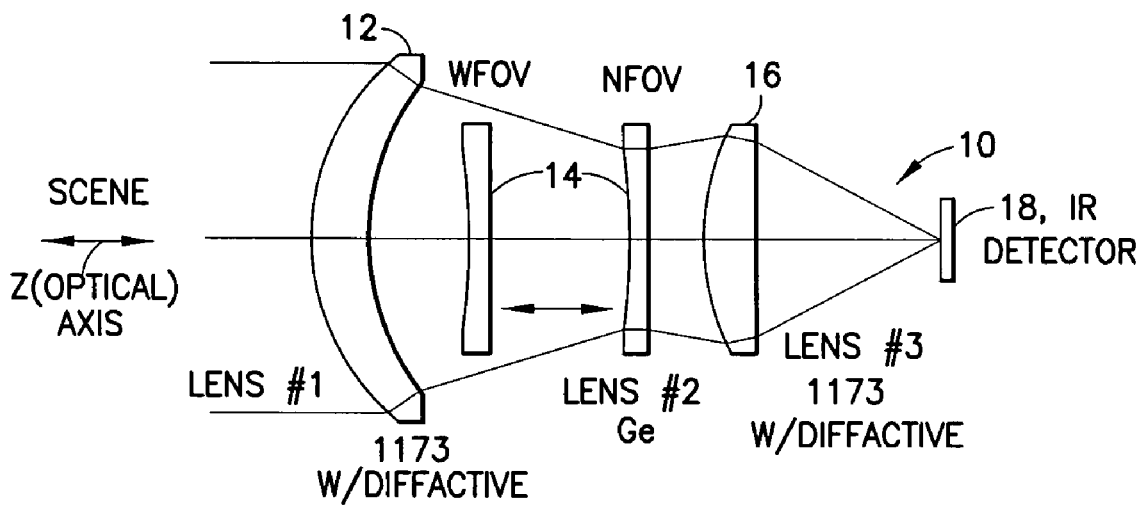
FIG. 2 is a diagram that illustrates the zoom lens assembly in accordance with this invention that does not require mechanical re-focusing for a change in temperature.

FIG. 2 is a diagram that illustrates an example of a zoom lens assembly 10, in accordance with this invention, that does not require mechanical re-focusing for a change in temperature. In the preferred embodiment the first lens 12 (Lens#1) is a positive power lens element comprised of a Chalcogenide infrared glass, preferably TI-1173, developed by assignee of this patent application, or an equivalent such as AMTIR-3 (Amorphous Material Transmitting Infrared Radiation), available from Amorphous Materials Inc. of Garland, Tex. TI-1173 and AMTIR-3 are both characterized as exhibiting a low change in index of refraction (n) for a change in temperature (T) (dn/dT). By example, published general property values for AMTIR-3 are shown in FIG. 7A, while the values for the thermal change in refractive index over the range of 25–65° C. are shown in FIG. 7B. Reference may also be had to the Table shown in FIG. 8.

Figure 7C:
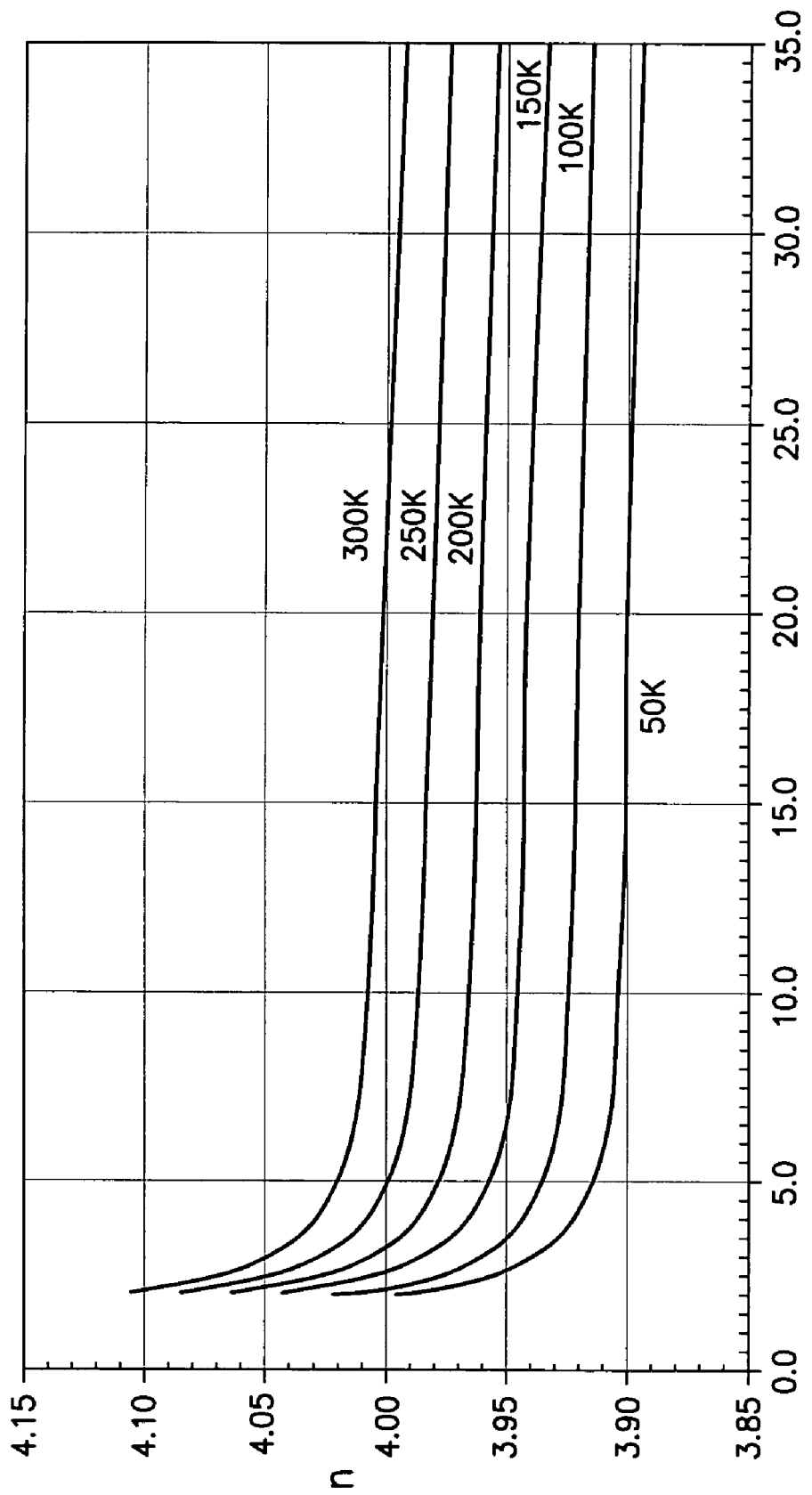
FIG. 7C is a graph showing the change in refractive index (n) versus wavelength ($\lambda$) for Ge over a temperature range of 50 K to 300 K.

In FIG. 2 the first lens 12 includes a diffractive surface, preferably the second or rear surface. The second lens 14 (Lens#2) is a negative power lens that is manually or mechanically movable between the WFOV and NFOV positions, and is preferably comprised of a different lens material than the first lens 12, more preferably a material having a higher dn/dT, such as Ge. Reference can be made to FIG. 7C for a graph showing the change in refractive index of Ge over a range of temperatures. The third lens 16 (Lens#3) is also a positive power lens and is comprised of the lower dn/dT material, such as TI-1173 or AMTIR-3, and also includes a diffractive surface, preferably the second or rear surface. An IR detector 18, although not forming a part of the zoom lens assembly 10 per se, is shown to be located at the focal plane of the lens assembly 10.

Figure 1:
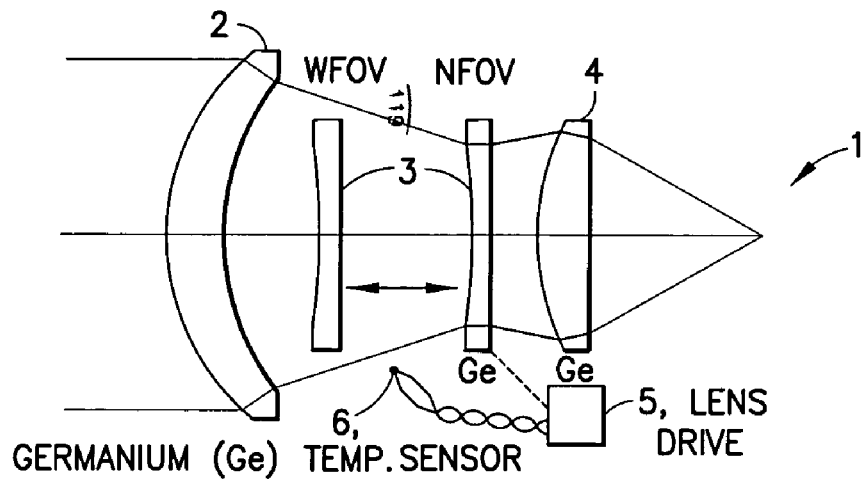
FIG. 1 is a diagram shown a prior art zoom lens assembly that requires mechanical re-focusing for a change in temperature.

In accordance with this invention, the required focus position varies only as a function of zoom position, and not temperature. The zoom lens assembly 10 is less complex and less expensive that the prior art assembly 1 shown in FIG. 1, as it does not require temperature sensors, software lookup tables, additional motors, non-linear cam motions and the like that are required to electro-mechanically compensate for temperature changes in the prior art zoom lens assembly 1.

FIG. 3 shows a first Table that lists design parameters and selection criteria for the zoom lens assembly 10, and FIG. 4 shows a second Table that lists first order optical characteristics of the zoom lens assembly 10. In FIG. 3 the index of refraction (index) is given for a wavelength of 10 microns, the V Number is a measure of the dispersion of the lens material, and is listed over a wavelength band of 8–12 microns, and under Surface Type R1 is the front or first surface (to the left of the drawing in FIG. 2) and R2 is the rear or second surface (to the right of the drawing in FIG. 2). The Z (optical) axis is also shown in the drawing. In addition, Power=1/EFL, i.e., the reciprocal of the Effective Focal Length (in inches). The exact lens parameters such as radii, center thickness, air gaps, aspheric coefficients and diffractive surface parameters (surfaces R2 of lenses 12 and 16) for this exemplary embodiment are given below in the output of an optical design software program.

|  | RDY |  | THI |  | RMD |  | GLA |
|---|---|---|---|---|---|---|---|
| >OBJ: | INFINITY |  | INFINITY |  |  |  |  |
| 1: | INFINITY |  | 0.242069 |  |  |  | '1173' |
| 2: | 1.36920 |  | 0.320000 |  |  |  |  |
| STO: | 1.46067 |  | 0.320000 |  |  |  |  |
| HOE: |  |  |  |  |  |  |  |
| HV1: | REA | HV2: | REA | HOR: | −1 |  |  |
| HX1: | 0.000000E+00 | HY1: | 0.000000E+00 | HZ1: | 0.1000000E+19 |  |  |
| HX2: | 0.000000E+00 | HY2: | 0.000000E+00 | HZ2: | 0.1000000E+19 |  |  |
| HWL: | 10200.00 | HTO: | ASP | HCT: | R |  |  |
| HCO |  |  |  |  |  |  |  |
| C1: | 4.8692E−03 | C67: | 7.5698E−03 | C68: | 5.6944E−03 |  |  |
| C69: | −5.1991E−04 | C70: | 1.6529E−03 |  |  |  |  |
| 4: | INFINITY |  | 1.126000 |  |  |  |  |
| 5: | −5.62980 |  | 0.100000 |  |  |  | 'ge' |
| 6: | 11.03679 |  | 0.294000 |  |  |  |  |
| ASP: |  |  |  |  |  |  |  |
| K: | 0.000000 |  |  |  |  |  |  |
| IC: | YES | CUF: | 0.000000 |  |  |  |  |
| A: | 0.166792E−01 | B: | 0.104610E−01 | C: | 0.515184E−03 | D: | 0.299333E−01 |
| 7: | 1.35183 |  | 0.300000 |  |  |  | '11.73' |
| ASP: |  |  |  |  |  |  |  |
| K: | 0.000000 |  |  |  |  |  |  |
| IC: | YES | CUF: | 0.000000 |  |  |  |  |
| A: | −.766479E−01 | B: | −.110122E−01 | C: | −.163607E−01 | D: | 0.729941E−02 |
| 8: | INFINITY |  | 0.953000 |  |  |  |  |
| HOE: |  |  |  |  |  |  |  |
| HV1: | REA | HV2: | REA | HOR: | −1 |  |  |
| HX1: | 0.000000E+00 | HY1: | 0.000000E+00 | HZ1: | 0.1000000E+19 |  |  |
| HX2: | 0.000000E+00 | HY2: | 0.000000E+00 | HZ2: | 0.1000000E+19 |  |  |
| HWL: | 10200.00 | HTO: | SPH | HCT: | R |  |  |
| HCO |  |  |  |  |  |  |  |
| C1: | 1.4143E−02 |  |  |  |  |  |  |
| 9: | INFINITY |  | 0.025000 |  |  |  | 'si' |
| 10: | INFINITY |  | 0.030000 |  |  |  |  |
| IMG: | INFINITY |  | 0.000000 |  |  |  |  |

SPECIFICATION DATA

| FNO | 1.00000 |  |  |  |  |
|---|---|---|---|---|---|
| DIM | IN |  |  |  |  |
| WL | 12774.70 | 11740.85 | 10238.02 | 8766.73 | 7746.40 |
| REF | 3 |  |  |  |  |

-continued

| WTW | 38 | 79 | 99 | 85 | 38 |
|---|---|---|---|---|---|
| XIM | 0.00000 | 0.00000 | 0.00000 | | 0.00000 |
| YIM | 0.00000 | 0.12000 | 0.16000 | | 0.20000 |
| WTF | 1.00000 | 1.00000 | 1.00000 | | 1.00000 |
| VUX | −0.00005 | 0.00009 | 0.00020 | | 0.00034 |
| VLX | −0.00005 | 0.00009 | 0.00020 | | 0.00034 |
| VUY | −0.00005 | 0.13316 | 0.22727 | | 0.33112 |
| VLY | −0.00005 | −0.02185 | −0.02926 | | −0.03675 |

In the foregoing listing:
RDY is the radius of the surface
THI is the center thickness of the surface
STO indicates the surface location of the aperture stop
IMG indicates the final image plane surface
HOE indicates a holographic (or diffractive) surface type
  HV1 indicates real or virtual source, generally REA for real
  HV2 indicates real or virtual source, generally REA for real
  HOR is the diffraction design order, generally 1 or −1
  HX1 indicates source location in azimuth direction for HV1, generally 0
  HY1 indicates source location in elevation direction for HV1, generally 0
  HZ1 indicates source location in Z (along optical axis) direction for HV1, generally a very large value or infinity
  HX2 indicates source location in azimuth direction for HV2, generally 0
  HY2 indicates source location in elevation direction for HV2, generally 0
  HZ2 indicates source location in Z (along optical axis) direction for HV2, generally a very large value or infinity
  HWL is the design wavelength for surface ($\lambda$)
  HTO indicates surface type, either spherical or aspherical
  HCT indicates either rotationally symmetric or non-rotationally symmetric
  C1 is $2^{nd}$ order phase coefficient
  C2 is $4^{th}$ order phase coefficient
  C3 is $6^{th}$ order phase coefficient
  C67 4th order aspheric coefficients (A)
  C68 6th order aspheric coefficients (B)
  C69 $8^{th}$ order aspheric coefficients (C)
  C70 $10^{th}$ order aspheric coefficients (D)
ASP indicates an aspheric surface type
K is the conic coefficient of surface
IC indicated that the surface normal points in positive z-direction
CUF indicates a Fresnel surface radii if non-zero, and
A,B,C,D are the 4th, 6th, 8th and 10th order aspheric coefficients, respectively.
With regard to the Specification Data listed above:
FNO indicates the F-Number of the lens assembly
DIM indicates the dimensions (inches or mm)
WL indicates the wavelength range and specific design wavelengths for lens assembly (up to, for example, 20)
WTW is the relative weighting for the corresponding design wavelengths defined by WL
REF is the reference wavelength for calculating first order lens parameters, like Effective focal length
XIM is the object field point location at the image surface in azimuth direction, used for optimization and analysis
YIM is the object field point location at the image surface in elevation direction, used for optimization and analysis
WTF is the relative weighting for the corresponding field points defined by XIM & YIM
VUX is the entrance pupil vignetting value in the +Azimuth direction for each corresponding field point defined by XIM & YIM
VLX is the entrance pupil vignetting value in the −Azimuth direction for each corresponding field point defined by XIM & YIM
VUY is the entrance pupil vignetting value in the +Elevation direction for each corresponding field point defined by XIM & YIM, and
VLY is the entrance pupil vignetting value in the −Elevation direction for each corresponding field point defined by XIM & YIM.

The general surface definition is given by:

$$SAG(Z) = \frac{CC*Y^\wedge 2}{1+SQRT[1-(1+K)*CC^\wedge 2*Y^\wedge 2]} + A*Y^\wedge 4 + B*Y^\wedge 6 + C*Y^\wedge 8 + D*Y^\wedge 10 + HOR*\left\{\frac{C1*Y^\wedge 2 + C2*Y^\wedge 4 + C3*Y^\wedge 6}{N1-N2} - \frac{\lambda}{N1-N2} * \frac{INT[C1*Y^\wedge 2 + C2*Y^\wedge 4 + C3*Y^\wedge 6]}{\lambda}\right\}$$

where:
  Z is the Sag value along the Z-axis or optical axis
  Y is the semi-diameter height
  CC is the base curvature (1/radius) of surface
  K is the conic coefficient of surface
  A,B,C,D are the 4th, 6th, 8th and 10th order aspheric coefficients, respectively
  HOR is the diffraction design order, generally 1 or −1
  $\lambda$ is the design wavelength for the surface
  N1 is the Refractive index of material preceding the surface
  N2 is the Refractive index of material following the surface
  C1 is $2^{nd}$ order phase coefficient
  C2 is $4^{th}$ order phase coefficient
  C3 is $6^{th}$ order phase coefficient, and
  INT is the mathematical Integer Function.

Figure 5A:
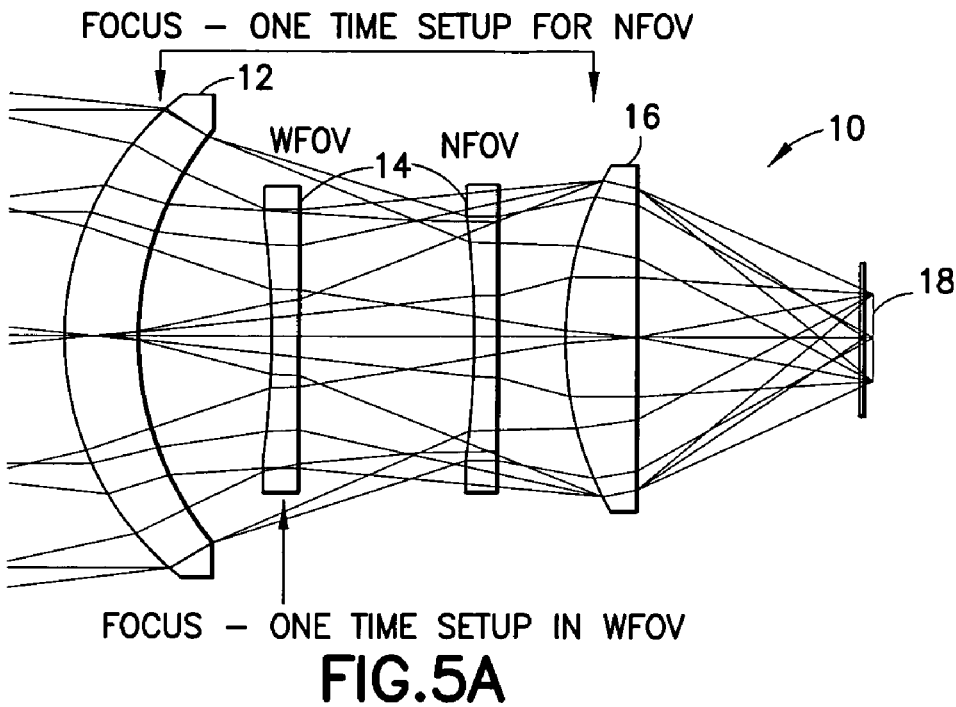
FIG. 5A is a diagram that illustrates the zoom lens assembly in accordance with this invention in both the WFOV and NFOV positions simultaneously, and also illustrates the paths of rays arriving from a scene for each position.

FIG. 5A is a diagram that illustrates the zoom lens assembly 10 in both the WFOV and NFOV positions simultaneously, and also illustrates the paths of rays arriving from a scene for each position. In this example the lens assembly 10 is a 160×120, 50 micron, 25–50 mm zoom, with F/1.0. Note that the spacing between lens 12 and lens 16 requires a single (one-time) focus calibration for the NFOV position of lens 14, while a single focus calibration is required for setting the position of lens 14 in its WFOV position. Lens 14 is positioned at different locations in order to change the effective focal length or field of view of the lens assembly 10.

Figure 5B:
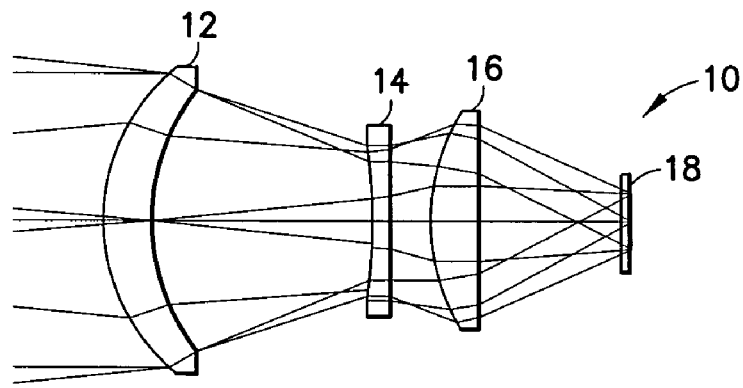
FIG. 5B is a diagram that illustrates the zoom lens assembly of FIG. 5A in only the NFOV position.
Figure 5C:
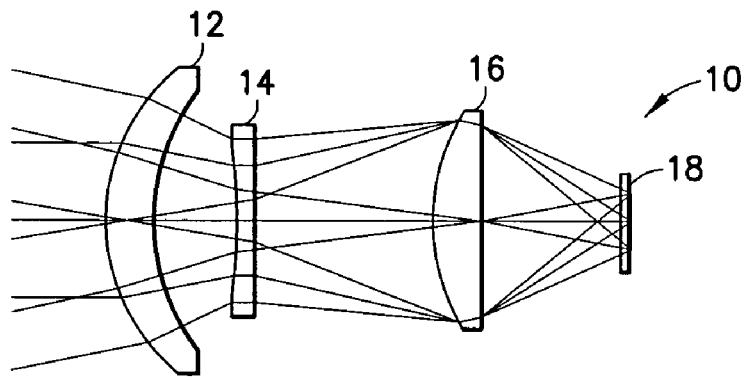
FIG. 5C is a diagram that illustrates the zoom lens assembly of FIG. 5A in only the WFOV position.

FIG. 5B is a diagram that illustrates the zoom lens assembly 10 in only the NFOV position; while FIG. 5C illustrates the zoom lens assembly 10 in only the WFOV position.

Figure 6A:
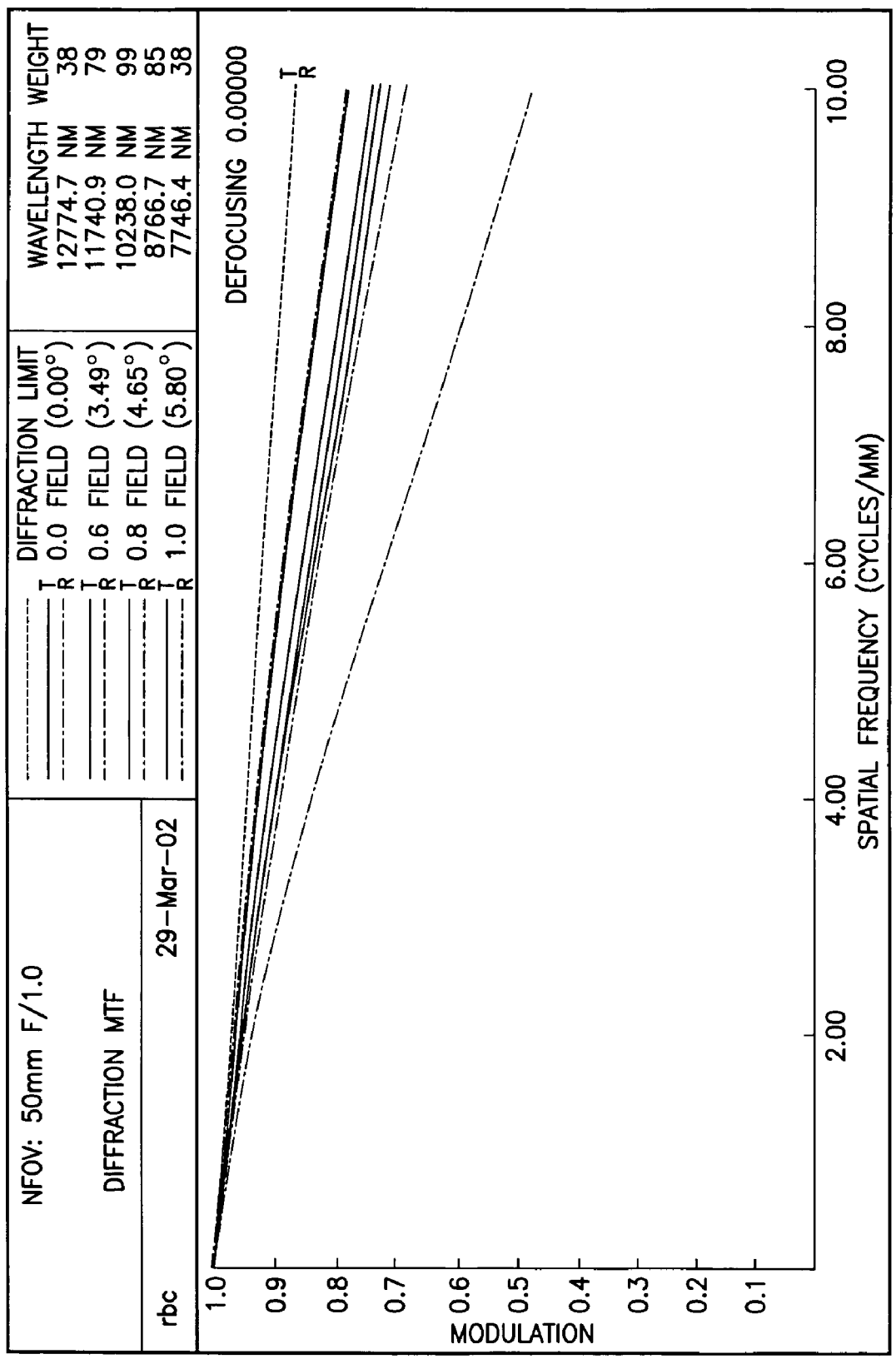
FIGS. 6A and 6B are graphs depicting the nominal MTF as a function of frequency for the NFOV (50 mm F/1.0) and the WFOV (50 mm F/0.91)cases, respectively, of FIGS. 5B and 5C, respectively.
Figure 6B:
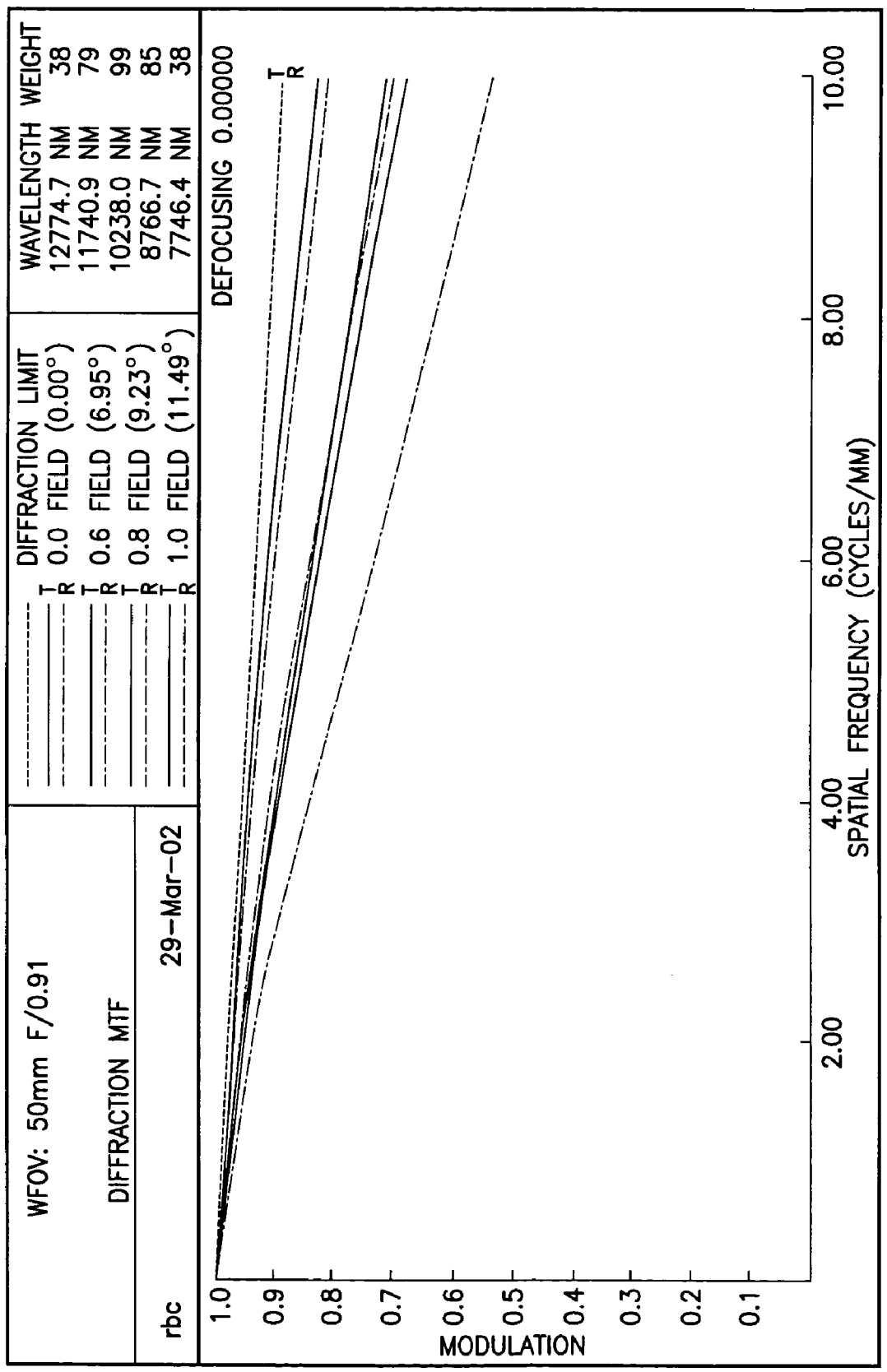

FIGS. 6A and 6B are graphs depicting the nominal MTF as a function of frequency for the NFOV and the WFOV cases, respectively, of FIGS. 5B and 5C, respectively.

The following Table illustrates exemplary spherical and aspherical (diffractive) surface parameters for the lenses 12, 14 and 16 of the embodiment of the zoom lens assembly 10.

Surface Parameters ranges, numbers of lens elements and the like may be attempted by those skilled in the art. Furthermore, in some embodiments only one of the lenses may have a diffractive surface, in this case preferably the second surface of the third lens 16. However, in that the diffractive surfaces provide color correction, e.g., light at wavelengths of 8–12 microns is brought to a common focus, if only the second surface of lens 16 is used then an imbalance between axial color and lateral color may be present. The imbalance may be corrected, if desired, by adding another lens element. Furthermore, in some embodiments the zoom lens assembly 10 may be adjusted in more than two steps between the WFOV and NFOV positions, and in some embodiments may be continuously adjustable between these two positions.

|  | Lens #1, 12 | | Lens #2, 14 | | Lens #3, 16 | |
|---|---|---|---|---|---|---|
| Parameter | Front | Back | Front | Back | Front | Back |
| Material | 1173 | | Ge | | 1173 | |
| Radii [in] | 1.3692 | 1.46067 | −5.6298 | 11.03679 | 1.35183 | Infinity |
| Center Thickness [in] | 0.32 | 1.446 | 0.10 | 0.294 | 0.30 | 0.99 in air |
| Spherical | X | | X | | | X |
| Asphere | | X | | X | X | |
| K coefficient | | 0 | | 0 | 0 | |
| A coefficient | | 0.0075698 | | 0.016679200 | −0.07664790 | |
| B coefficient | | 0.0056944 | | 0.010461000 | −0.01101220 | |
| C coefficient | | −0.0005199 | | 0.000515184 | −0.01636070 | |
| D coefficient | | 0.0016529 | | 0.029933300 | 0.00729941 | |
| Diffractive | | X | | | | X |
| HOR | | −1 | | | | −1 |
| HWL [$\mu$m] | | 10.2 | | | | 10.2 |
| C1 coefficient | | 0.0048692 | | | | 0.014143 |
| C67 coefficient (A) | | 0.0075698 | | | | 0 |
| C68 coefficient (B) | | 0.0056944 | | | | 0 |
| C69 coefficient (C) | | −0.0005199 | | | | 0 |
| C70 coefficient (D) | | 0.0016529 | | | | 0 |

Based on the foregoing description it can be appreciated that the zoom lens assembly 10, in accordance with this invention, compensates optically, as opposed to mechanically, for changes in temperature. In the preferred embodiment the difference in focus between the WFOV and NFOV zoom lens positions over temperature is minimized such that any actual shift in focus falls within the depth of focus of the zoom lens assembly 10. As can be appreciated by an examination of FIGS. 6A and 6B, the zoom lens assembly 10, when constructed in accordance with this invention, provides an acceptable level of MTF performance over a range of operating temperature, without requiring the prior art electro-mechanical re-focusing of the lens elements to compensate for a change in temperature. That is, the zoom lens assembly is optically substantially athermalized for operation over a range of temperatures.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims.

As but a few examples of such modifications, the use of other similar or equivalent lens materials, lens prescriptions, lens sizes and spacings, wavelength ranges, temperature However, in this case it may also be desirable to also provide for a corresponding movement of the third lens 16, in addition to the movement of the second lens 14.

It should be further realized that this invention is not limited for use with only the IR transmissive materials discussed thus far. For example, and referring to FIG. 8, suitable and non-limiting materials for use in constructing the $1^{st}$ and $3^{rd}$ lens elements 12 and 16 1173, GASIR2, AMTIR3, ZnS and ZnSe for 8–12 micron operation, and 1173, GASIR2, AMTIR3, ZnS, ZnSe and Silicon for 3–5 micron operation. GASIR2 is a chalcogenide, 1173-like glass made by Umicore (www.optics.umicore.com), Z. A. du Boulais, 35690 Acigne, France.

It is noted that the very low index of refraction for ZnS and ZnSe (<2.4) would require the use of steeper radii and thicker lenses, making the use of these two materials less than the most preferred.

At present, the use of an alternate material for the second lens 14 is not preferred, but certainly is not precluded, since the dn/dT of all other commonly used IR materials is substantially less than that of Ge.

Note as well that these configurations are suitable for the near IR wavelength band (3–5 microns) as well. For operation in the 3–5 micron band, Silicon may be used in place of 1173 for the first and third lens elements 12 and 16.

In general, it is desired in this invention that a change in refractive index for a change in temperature of a first material is less than a change in refractive index for a change in temperature of a second material, where the first and third lens elements 12 and 16 are comprised of the first material that differs from the second material that comprises the second lens element 14. However, this general relationship would allow the use of a 1173-ZnSe-1173, or a ZnS—ZnSe—ZnS material combination which, most likely, would not be operable or would be only marginally useful. In preferred embodiments of this invention it can be stated that the dn/dT for the first and third lenses 12 and 16 should be less than about 175, and that the dn/dT for the second lens 14 should be greater than about 375. Stated another way, it may be said that in the preferred embodiments of this invention the dn/dT for the second lens 14 should be at least about two times greater, and more preferably about three times greater, than the dn/dT for the first and third lenses 12 and 16. In a most presently preferred embodiment of this invention it can be said that an optimum performance solution is achieved with a dn/dT of about 58 for the first and third lenses 12 and 16, and with a dn/dT of about 395 for the second lens 14. Referring to FIG. 8, this embodiment would correspond to the use of TI-1173 for the first and third lens elements 12 and 16, and the use of Ge for the second lens element 14, assuming operation in the 8–12 micron wavelength range.

It is pointed out that all such and similar modifications to the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. An a thermalized zoom lens assembly comprising a plurality of lens elements disposed along an optical axis that passes through an aperture for viewing a scene to a focal point of the zoom lens assembly, said lens elements comprising in a sequence along said optical axis in a direction from the scene to the focal point: a first surface of a first lens element, said first lens element having a positive power and a second surface opposite said first surface; a first surface of a second lens element, said second lens element having a negative power and a second surface opposite said first surface; and a first surface of a third lens element, said third lens element having a positive power and a second surface opposite said first surface, where said first and third lens elements are comprised of a firm material that differs from a second material that comprises said second lens element, where a change in refractive index for a change in temperature (dn/dT) of said first material is less than a change in refractive index for a change in temperature of said second material by a predetermined amount, and where both of said second surface of said first lens element and said second surface of said third lens element are diffractive surfaces.

2. A zoom lens assembly as in claim 1, where said first material comprises a $Ge_{28}Sb_{12}Se_{60}$ glass or equivalent thereof.

3. A zoom lens assembly as in claim 1, where said first material comprises TI-1173 or an equivalent thereof.

4. A zoom lens assembly as in claim 1, where said first material comprises AMTIR-3 or an equivalent thereof.

5. A zoom lens assembly as in claim 1, where at least said second lens element is movable between a wide field of view (WFOV) position and a narrow field of view (NFOV) position, and where a difference in focus between the WFOV and NFOV positions, over a range of temperatures, is such that any shift in focus falls within the depth of focus of said athermalized zoom lens assembly.

6. A zoom lens assembly as in claim 1, further comprising an IR detector disposed at the focal point.

7. A zoom lens assembly as in claim 1, where the dn/dT for the first and third lens elements is less than about 175 $10^{-6}/° C.$, and where the dn/dT for the second lens element is greater than about 375 $10^{-6}/° C.$ 8. A zoom lens assembly as in claim 1, where the dn/dT for the second lens element is at least about two times greater than the dn/dT for the first and third lens elements.

9. A zoom lens assembly as in claim 1, operable in a band of wavelengths from about 8 microns to about 12 microns.

10. An athermalized zoom lens assembly comprising a plurality of lens elements disposed along an optical axis that passes through an aperture for viewing a scene to a focal point of the zoom lens assembly, said lens elements comprising, in a sequence along said optical axis in a direction from the scene to the focal point: a first surface of a first lens element, said first lens element having a positive power and a second surface opposite said first surface; a first surface of a second lens element, said second lens element having a negative power and a second surface opposite said first surface; and a first surface of a third lens element, said third lens element having a positive power and a second surface opposite said first surface, where said first and third lens elements are comprised oft first material that differs from a second material that comprises said second lens element where a change in refractive index for a change in temperature (dn/dT) of said first material is less than a change in refractive index for a change in temperature of said second material by a predetermined amount, and where at least one of said second surface of said first lens element and said second surface of said third lens element is a diffractive surface, where said first material comprises a Chalcogenide infrared transmissive glass, and where said second material comprises Ge.

11. An athermalized zoom lens assembly comprising a plurality of lens elements disposed along an optical axis that passes through an aperture for viewing a scene to a focal point of the zoom lens assembly, said lens elements comprising, in a sequence along said optical axis in a direction from the scene to the focal point: a first surface of a first lens element, said first lens element having a positive power and a second surface opposite said first surface; a first surface of a second lens element, said second lens element having a negative power and a second surface opposite said first surface; and a first surface of a third lens element, said third lens element having a positive power and a second surface opposite said first surface, where said first and third lens elements are comprised of a first material that differs from a second material that comprises said second lens element where change in refractive index for a change in temperature (dn/dT) of said first material is less than a change in refractive index for a change in temperature of said second material by a predetermined amount, and where at least one of said second surface of said first lens element and aid second surface of said third lens element is a diffractive surface, where the dn/dT for the second lens element is at least about three times greater than the dn/dT for the first and third lens elements.

12. An athermalized zoom lens assembly comprising a plurality of lens elements disposed along an optical axis that passes through an aperture for viewing a scene to a focal point of the zoom lens assembly, said lens elements comprising, in a sequence along said optical axis in a direction from the scene to the focal point a first surface of a first lens element, said first lens element having a positive power and a second surface opposite said first surface; a first surface of a second lens element, said second lens element having a negative power and a second surface opposite said first surface; and a first surface of a third lens element, said third lens element having a positive power and a second surface opposite said first surface, where said first and third lens elements are comprised of a first material that differs from a second material that comprises said second lens element, where a change in refractive index for a change in temperature (dn/dT) of said first material is less than a change in refractive index for a change in temperature of said second material by a predetermined amount, and where at least one of said second surface of said first lens element and said second surface of said third lens element is a diffractive surface, where the dn/dT for the second lens element is about 395 $10^{-6}$/° C., and where the dn/dT for each of the first and third lens elements is about 58 $10^{-6}$/° C.

13. An athermalized radiation zoom lens assembly comprising a plurality of lens elements disposed along an optical axis that passes through an aperture for viewing a scene containing a thermal energy source to a focal point of the zoom lens assembly, said lens elements comprising, in a sequence along said optical axis in a direction from the scene to the focal point:
   a spheric first surface of a first lens element, said first lens element having a positive power and an aspheric, diffractive second surface opposite said first surface;
   a spheric first surface of a second lens element, said second lens element having a negative power and an aspheric second surface opposite said first surface; and
   an aspheric first surface of a third lens element, said third lens element having a positive power and a spheric, diffractive second surface opposite said first surface;
   where said first and third lens elements are comprised of a first material that differs from a second material that comprises said second lens element, where a change in refractive index for a change in temperature (dn/dT) of said first material is less than a change in refractive index for a change in temperature of said second material by a predetermined amount,
   and where at least said second lens element is movable between a wide field of view (WFOV) position and a narrow field of view (NFOV) position, and where a difference in focus between the WFOV and NFOV positions, over a range of temperatures, is such that a shift in focus falls within the depth of focus of said athermalized zoom lens assembly.

14. A zoom lens assembly as in claim 13, where said first material comprises a Chalcogenide infrared transmissive glass, and where said second material comprises Ge.

15. A zoom lens assembly as in claim 13, where said first material comprises a $Ge_{28}Sb_{12}Se_{60}$ glass or equivalent thereof.

16. A zoom lens assembly as in claim 13, where said first material comprises TI-1173 or an equivalent thereof.

17. A zoom lens assembly as in claim 13, where said first material comprises AMTIR-3 or an equivalent thereof.

18. A zoom lens assembly as in claim 13, where the dn/dT for the first and third lens elements is less than about 175 $10^{-6}$/° C., and where the dn/dT for the second lens element is greater than about 375 $10^{-6}$/° C.

19. A zoom lens assembly as in claim 13, where the dn/dT for the second lens element is at least about two times greater than the dn/dT for the first and third lens elements.

20. A zoom lens assembly as in claim 13, where the dn/dT for the second lens element is at least about three times greater than the dn/dT for the first and third lens elements.

21. A zoom lens assembly as in claim 13, where the dn/dT for the second lens element is about 395 $10^{-6}$/° C. and where the dn/dT for each of the first and third lens elements is about 58 $10^{-6}$/° C.

22. A zoom lens assembly as in claim 13, operable in a band of wavelengths from about 8 microns to about 12 microns.

23. A method of athermalized a zoom lens assembly of a type that comprises a plurality of lens elements disposed along an optical axis that runs from a scene to a focal point of the zoom lens assembly, comprising:
   providing, along said optical axis, first and third lens elements that are comprised of a first material and that have a positive power;
   providing, along said optical axis, a second lens element interposed between said first and third lens elements and movable along said optical axis between a WFOV and NFOV position, said second lens element having a negative power and being comprised of a saved material; where a change in refractive index for a change in temperature (dn/dT) of said first material is less than a change in refractive index for a change in temperature of said second material by a predetermined amount;
   compensating for a change in temperature on focal position between a WFOV a NFOV position such that a shift in focus falls within the depth of focus of said zoom lens assembly; and
   color correcting incident radiation using a diffractive surface on of said first and third lens elements.

24. A method as in claim 23, where said first material comprises a $Ge_{28}Sb_{12}Se_{60}$ glass or equivalent thereof.

25. A method as in claim 23, where said first material comprises TI-1173 or an equivalent thereof.

26. A method as in claim 23, where said first material comprises AMTIR-3 or an equivalent thereof.

27. A method as in claim 23, where the dn/dT for the first and third lens elements is less than about 175 $10^{-6}$/° C. and where the dn/dT for the second lens element is greater than about 375 $10^{-6}$/° C.

28. A method as in claim 23, where the dn/dT for the second lens element is at least about two times greater than the dn/dT for the first and third lens elements.

29. A method as in claim 23, where the zoom lens assembly is operable in a band of wavelengths from about 8 microns to about 12 microns.

30. A method of athermalized a zoom lens assembly of a type that comprises a plurality of lens elements disposed along an optical axis that runs from a scene to a focal point of the zoom lens assembly, comprising:
   providing, along said optical axis, first and third lens elements that are comprised of a first material and that have a positive power;
   providing, along said optical axis, a second lens element interposed between said first and third lens elements and movable along said optical axis between a WFOV and NFOV position, said second lens element having a negative power and being comprised of a second material; where a change in refractive index for a change in temperature (dn/dT) of said first material is less than a change in refractive index for a change in temperature, of said second material by a predetermined amount compensating for a change in temperature on focal position between a WFOV a NFOV position such that a shift in focus falls within the depth of focus of said zoom lens assembly; and color correcting incident radiation using a diffractive surface on at least one of said first and third lens elements, where said first material comprises a Chalcogenide infrared transmissive glass, and where said second material comprises Ge.

31. A method of athermalizing a zoom lens assembly of a type that comprises a plurality of lens elements disposed along an optical axis that runs from a scene to a focal point of the zoom lens assembly, comprising:

providing, along said optical axis, first and third lens elements that are comprised of a first material and that have a positive power;

providing, along said optical axis, a second lens element interposed between said first and third lens elements and movable along said optical axis between a WFOV and NFOV position, said second lens element having a negative power and being comprised of a second material; where a change in refractive index for a change in temperature (dn/dT) of said first material is less than a change in refractive index for a change in temperature of said second material by a predetermined amount;

compensating for a change in temperature on focal position between a WFOV a NPOV position such that a shift in focus falls within the depth of focus of said zoom lens assembly; and color correcting incident radiation using a diffractive surface on at least one of said first and third lens elements, where the dn/dT for the second lens element is at least about three times greater than the dn/dT for the first and third lens elements.

32. A method of athermalizing a zoom lens assembly of a type that comprises a plurality of lens elements disposed along an optical axis that runs from a scene to a focal point of the zoom lens assembly, comprising:

providing, along said optical axis, first and third lens elements that are comprised of a first material and that have a positive power;

providing, along said optical axis, a second lens element interposed between said first and third lens elements and movable along said optical axis between a WFOV and NFOV position, said second lens element having a negative power and being comprised of a second material; where a change in refractive index for a change in temperature (dn/dT) of said first material is less than a change in refractive index for a change in temperature of said second material by a predetermined amount;

compensating for a change in temperature on focal position between a WFOV a NFOV position such that a shift in focus falls within the depth of focus of said zoom lens assembly, and color correcting incident radiation using a diffractive surface on at least one of said first and third lens elements, where the dn/dT for the second lens element is about $395 \; 10^{-6}/°$ C., and where the dn/dT for each of the first and third lens elements is about $58 \; 10^{-6}/°$ C.

* * * * *